United States Patent [19]
Dodds

[11] Patent Number: 4,842,049
[45] Date of Patent: Jun. 27, 1989

[54] HEAT EXCHANGING APPARATUS FOR COOLING AND CONDENSING BY EVAPORATION

[75] Inventor: Diego E. F. Dodds, Buenos Aires, Argentina

[73] Assignee: Dodds-Oboler, Inc., Dade County, Fla.

[21] Appl. No.: 62,651

[22] Filed: Jun. 16, 1987

Related U.S. Application Data

[62] Division of Ser. No. 797,734, Nov. 14, 1985, Pat. No. 4,693,302.

[30] Foreign Application Priority Data

Dec. 28, 1984 [AR] Argentina .............................. 299141

[51] Int. Cl.⁴ .......................... F28D 3/00; F28F 7/00; F28F 21/06; F28G 5/00
[52] U.S. Cl. ........................ 165/46; 165/84; 165/115; 165/118; 165/900; 261/112.1; 261/153
[58] Field of Search .................. 165/46, 84, 905, 155, 165/118, 115, 900; 261/112, 153

[56] References Cited

U.S. PATENT DOCUMENTS 2,602,644  7/1952  Sandstrom ........................... 165/84
3,227,630  1/1966  Beckman .............................. 165/46

FOREIGN PATENT DOCUMENTS 606028  11/1934  Fed. Rep. of Germany ........ 165/84

Primary Examiner—Albert W. Davis, Jr.
Attorney, Agent, or Firm—Jim Zegeer

[57] ABSTRACT

A heat exchange apparatus having a first header for receiving fluid from a source, flexible thin-walled tubular plastic heat exchange elements defining a plurality of passages through a heat exchange zone and second header means for receiving fluid from said plastic heat exchange elements after passing through said heat exchange zone. Support elements are provided, supporting and rigidifying the flexible thin-walled tubular plastic heat exchange member. The plastic heat exchange element defining said plurality of passages is radially expandable by pressure of fluid from said source to avoid scale formation.

2 Claims, 11 Drawing Sheets

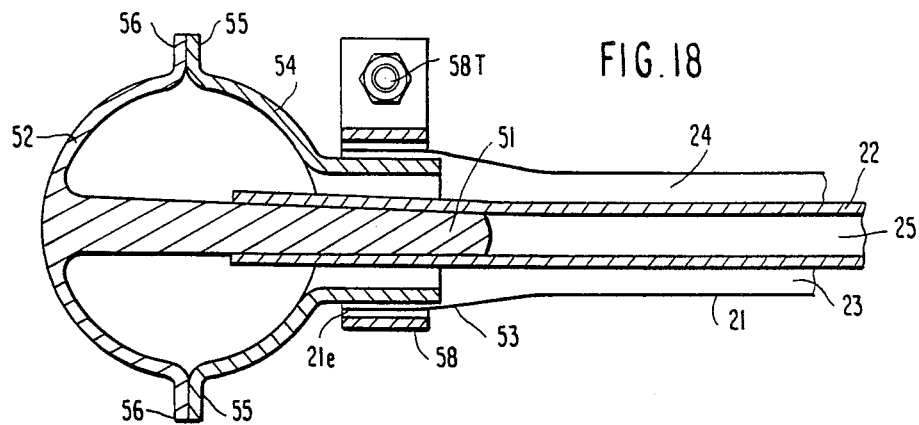
FIG. 18
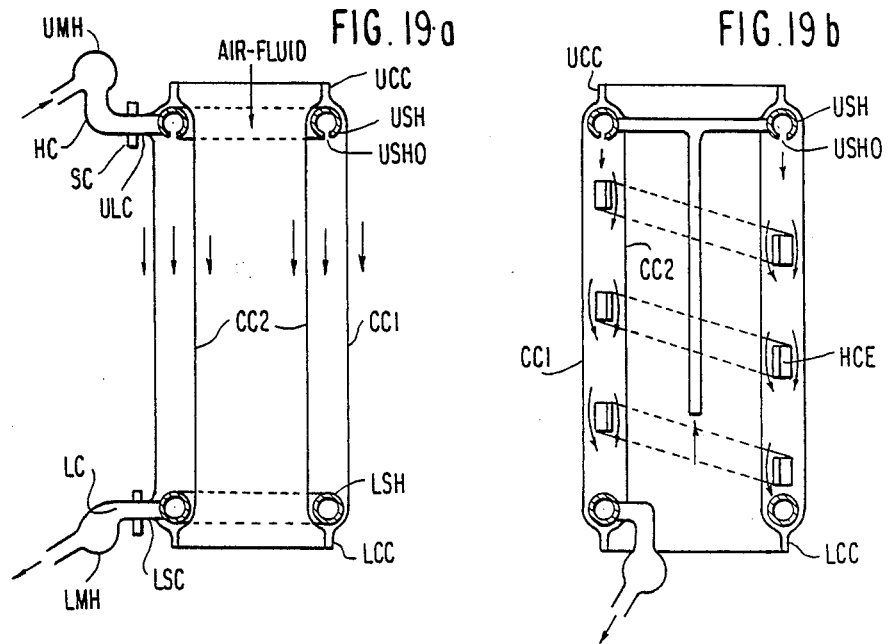
FIG. 19a
FIG. 19b
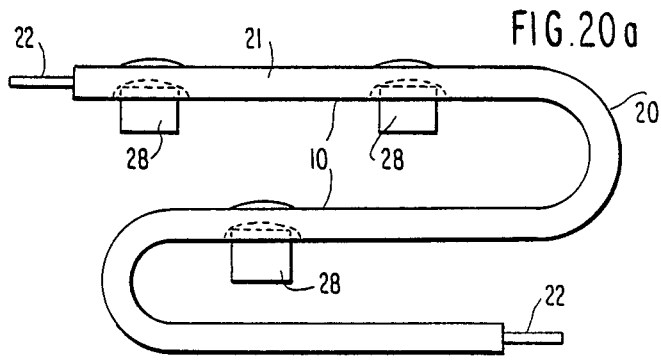
FIG. 20a

CROSS FLOW SYSTEM

HEAT EXCHANGING APPARATUS FOR COOLING AND CONDENSING BY EVAPORATION

This is a divisional of application Ser. No. 797,734, filed Nov. 14, 1985 now U.S. Pat. No. 4,693,302 granted Sept. 15, 1987.

BACKGROUND OF THE INVENTION

Cooling towers are the most common means used for recovering water which has been used to refrigerate some thermal process equipment or thermal machine. In a typical arrangement of a conventional cooling tower, a heat load is transferred to the water circulating through the heat exchanger and piped unto the cooling tower. Hot water is sprayed through nozzles on to the fill which includes a splash deck or laminar materials; the object is to break-up the mass of water into the largest possible surface; this surface is the actual heat transfer surface which brings the water into contact with the flowing air. Air circulation is usually obtained with fans of various types.

As the hot water and the air come into contact with each other, there is a transfer of heat from one to the other, but simultaneously there is also a transfer of mass, since a fraction of the water has vaporized and has been carried away by the moving air. The heat exchanging process is termed "evaporative", because the sensible heat of the water is converted into latent heat as it generates "vapor". Thus, this evaporation causes a constant loss of water in the system. Typically, the amount of water lost as vapor is replenished in the basin via a float valve. When the make-up water contains solids in solution, such as calcium carbonate, sulfates, magnesium, etc., the water is said to be "hard". As explained earlier, the cooling process is evaporative, the water vapor which leaves the cooling tower does not carry the solids it originally contained in its liquid state. These solids which remain in the mass of circulating water raise the overall content of solids until the water reaches a point of maximum saturation and any excess shall precipitate. These solids adhere on hot surfaces of the heat exchangers; successive layers will form a crust of scale with its detrimental effects on the overall heat transfer coefficients. A way to reduce the formation of scale is to increase the amount of volume of make-up water into the basin. This excess of make-up water dilutes the concentration of the solids contained in the open circuit water. The primary function of any cooling tower, conventional or closed circuit, is to economize water, thus, there is an economic limit to the use of the continuous bleed-off. There are cities where the authorities charge very high fines for this waste of water plus a penalty for the excessive use of the city sewage system.

A great part of the scale can be removed by chemical or mechanical means, however, the thin residue which usually remains over the cleaned surface enhances the rapid formation of new layers of scale; the process can repeat itself only a few timees, and a time comes when the thermal insulation of the scale is of such a magnitude that the heat exchanger must be scrapped and replaced by a new one. Of course, during all this time, the output or performance of the equipment served by the fouled heat exchanger has diminished; the scale would then be responsible for the drop in production, severed profits, lack of refrigeration, increase of the energy bills, break-down of furnaces, etc., etc. these uneconomical effects were noticed many years ago by the manufacturers of cooling towers; in response they created Closed Circuit Cooling Towers or Evaporative Fluid Coolers. A typical design of this equipment includes hot water flowing through a pipe connected to a bank of coils which is placed inside the cooling tower. The hot water flowing in the inside of the heat exchanger is indirectly cooled by the water that wets the outside surface of the tube bank. The cold water of the closed circuit is pumped back to the heat load by means of a pump. An expansion tank is required. The hot water keeps recirculating through the heat load and the cooling coils without ever coming into contact with the air; all the heat removed from the water of this closed system is sensible heat, thus no mass is lost or transferred by evaporation. The heat surrendered by the fluid inside of the coils is picked up by the water flowing over the outside of the tube; this water, the open circuit, comes into contact with the air. The heat transfer process between the open circuit water and the air is "evaporative" and identical to the process described for the conventional cooling tower described above.

The evaporative loss in the open circuit is compensated by the float valve. Any "hardness" in the make-up water shall now have an effect only on the outer surface of the heat exchanger. In summary, the Closed Circuit Evaporative Cooler has not eliminated the problem of scale build-up, it has simply changed the location of its effects; instead of fouling the surfaces of the heat load exchanger, the scale build-up takes place on the outside of the tubes or coils that comprise the Closed Circuit Heat exchanger inside the tower.

No doubt it's easier to attack and get rid of the scale deposited on the tower heat exchanger however, the cleaning is never absolute and gradually the efficiency drops producing the same detrimental effects described for conventional cooling towers. In my U.S. Pat. No. 4,443,389 and my Argentinian Patents 195,525 of Oct. 15, 1973 and 206,846 of Aug. 23, 1976, I disclosed a novel efficient and useful helical coil heat exchange structure and system for significantly reducing scale build-up.

Removing scale by chemical means is the usual manner. A reduction of the pH of the water in the open circuit is the prime reason to use chemicals and acid solutions. The greater the acidity, the better the descaling of the tube surfaces; however, as most tube banks are steel or other metals, the acids favor the descaling but then, the metal can be gradually destroyed.

This destruction does not occur when the tube banks are made of platic materials. In recent years a few manufacturers of Closed Evaporative Coolers have developed plastic heat exchangers. The commercial results (see Cooling Tower Institute Paper TP-261-A "A New Type of Closed Circuit Cooling Tower with Plastic Heat exchangers", Jan. 31, 1983) have been excellent and several points have been proven:

(a) The plastic surface tends to reject the adherence of scale.

(b) Chemicals used, either to remove any scale on the tubes or to destroy algae or other organics in the open circuit water, are harmless to the plastic materials used.

(c) The overall coefficient of heat transfer, as compared with all metal tube banks, is not as bad as it may look.

However, as shown in the above CTI paper, the plastic heat exchanger must have 3.5 to 4 times more transfer surface.

The object of the invention is to provide an improved heat exchanger. A further object of the invention is to provide an improved plastic heat exchanger. Another object of the present invention is to provide an improved plastic heat exchanger. Another object of the invention is to reduce heat transfer distance between the latent heat bearing fluid and the heat exchange fluid by making the interface member in thin inert plastic film, as thin as possible while retaining sufficient material to assure long life against abrasion by the flow of fluid material. Still another object of the invention is to provide plastic film heat exchange with significantly improved operating efficiency, reduced weight and overall physical size.

According to the present invention, a very thin plastic structure serves as the basic medium of heat exchange interface between the latent heat bearing first fluid on the one hand and the heat receptive second fluid on the other hand, and a rigidifying structure substantially parallel to the flow path of the first fluid. The plastic, preferably in the form of tubes, is very flabby and the shape of the tube, circular, for example, is only attained when the tube is submitted to a predetermined pressure, which is preferably low.

BRIEF DESCRIPTION OF THE DRAWINGS

The above and other objects, advantages and features of the invention will become more clear in view of the following specification and accompanying drawings wherein:

FIG. 18 illustrates connection of one arrangement of the plastic pipe assembly of FIG. 12 to a header according to the invention, FIG. 19a illustrates a further embodiment wherein a pair of coaxial thin wall plastic tubes form a heat exchange flow path, FIG. 19b shows a helical path defining means and maintains general form, FIG. 19c is a further modification of the embodiment shown in FIG. 19b, FIG. 20a illustrates a typical heat exchange installation incorporating the invention wherein the plastic coils are supported at intervals by support saddles.

DETAILED DESCRIPTION OF THE INVENTION

Figure 1:
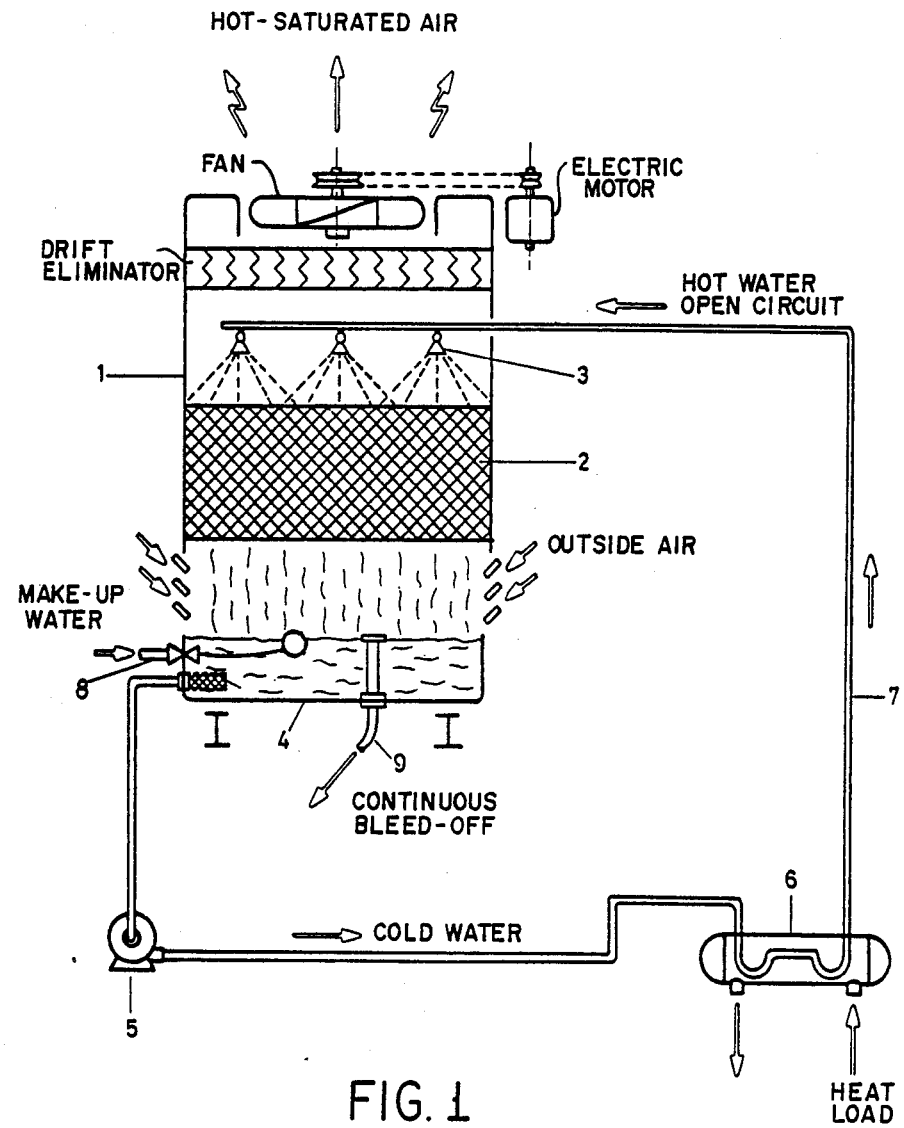
FIG. 1 is a typical arrangement of a conventional cooling tower.

Referring to FIG. 1, a typical arrangement of a convention cooling tower, a heat load is transferred to the water circulating through the heat exchanger 6 and piped up to the cooling tower 1. Hot water is sprayed through nozzles 3 on to the fill 2. This fill 2 includes a splash deck or laminar materials which break-up the mass of water into the largest possible surface; this surface is the actual heat transfer surface which brings the water into contact with the flowing air. Air circulation is usually obtained with fans F of various types.

As the hot water and the air come in contact with each other, there is a transfer of heat from one to the other, but simultaneously there is also a transfer of mass, since a fraction of the water has vaporized and has been carried away by the moving air.

The heat exchanging process is termed "evaporative", because the sensible heat of the water is converted into latent heat as it generates "vapor".

Thus, this evaporation causes a constant loss of water in the system. The amount of water lost as vapor is replenished in the basin 4 via a float valve 8.

When the make-up water contains solids in solution, such as calcium carbonate, sulfates, magnesium, etc., the water is said to be "hard". As explained earlier, the cooling process is evaporative, the water vapor which leaves the cooling tower does not carry the solids it originally contained in its liquid state.

These solids which remain in the mass of circulating water raise the overall content of solids until the water reaches a point of maximum saturation and any excess shall precipitate.

Figure 2:
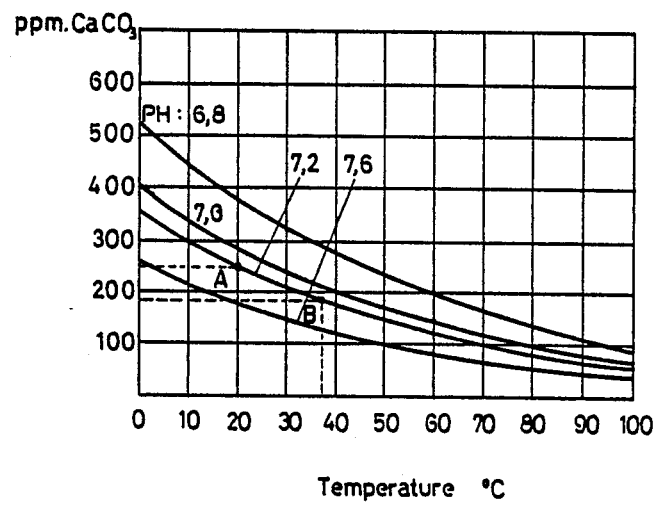
FIG. 2 is a chart showing typical curves of equilibrium for different samples of water which contain certain amounts of solid in solution.

FIG. 2 is a chart showing typical curves of equilibrium for different samples of water which contain certain amounts of solids in solution. The chart shows the inter-relation between: pH, temperature and ppm content of these samples.

Assume the make-up water has a pH of 7.2 and at 20° C. the solution is saturated (equilibrium) when it contains 250 ppm (point A); as the water picks up heat it looses its ability of holding solids, therefore, when it reaches 37° C., it cannot hold any more than 190 ppm (point B).

Obviously, the 60 ppm of solids had to precipitate at the time the water picked up the heat load. These solids adhere very firmly on the hot surfaces of the heat exchangers; successive layers will form a crust of scale with its detrimental effects on the overall heat transfer coefficients.

A series of examples on "Overall Heat Transfer Coefficients" have been compiled later herein.

A way to reduce the formation of scale is to increase the amount or volume of make-up water into the basin 4. The float valve 8 should only supply enough water to compensate for the evaporation loss plus any drift losses, however, if the over-flow pipe 9 is adjusted to a certain position which allows a constant draining or bleed-off, there will be more water flowing through valve 8, trying to maintain the level in the basin. As described above, this excess of make-up water dilutes the concentration of the solids contained in the open circuit water.

These uneconomical effects of scale were noticed many years ago by the manufacturers of cooling towers; in response they created Closed Circuit Cooling Towers or Evaporative Fluid Coolers. A typical design of this equipment has been depicted in FIG. 3. The hot water flowing through pipe 7 is connected to a bank of coils 10, which is placed inside the cooling tower 1. The hot water flowing in the inside of the heat exchanger 10 is indirectly cooled by the water that wets the outside surface of the tube bank. The cold water of the closed circuit is pumped back to the heat load 6 by means of pump 11. An expansion tank 12 is required. The hot water keeps recirculating through the heat load 6 and the cooling coils 10 without ever coming in contact with the air; all the heat removed from the water of this closed system is sensible heat, thus no mass is lost or transferred by evaporation. The heat surrendered by the fluid inside of the coils 10 is picked up by the water flowing over the outside of the tube; this water, the open circuit, comes in contact with the air. The heat transfer process between the open circuit water and the air is "evaporative" and identical to the process described for the conventional cooling tower of FIG. 1.

The cold water is collected in basin 4; it is pumped by pump 5 up to the nozzles 3 which spray it over the banks of coils 10.

The evaporative loss in the open circuit is compensated by the float valve 8. Any "hardness" in the make-up water shall now have an effect only on the outer surface of the heat exchanger 10.

THE OVERALL HEAT EXCHANGING COEFFICIENT

So as to enable comparisons of different heat exchangers, with and without scale deposits, the following examples have been prepared.

The film factors have been assumed at normal fluid velocities used in closed circuit evaporative coolers.

The heat transfer equation used in these examples is:

$$U = \frac{1}{\frac{1}{f \cdot 1} + \frac{e \cdot 1}{k \cdot 1} + \frac{1}{f \cdot 2} + \frac{e \cdot 2}{k \cdot 2}} =$$

where,

U = overall heat transfer coefficient; (Kcal/H.m² °C.)
f.1 = film factor of water inside the tubes = 2000 Kcal/H.m² °C.
f.2 = film factor of water on the outside of the tubes = 1000 Kcal/H.m² °C.
e.1 = tube wall thickness (mm)
e.2 = thickness of the scale (mm)
k.1 = thermal conductivity of the tube material:
  (i) Steel = 50,000 Kcal/H.m² °C. mm
  (ii) Polyethylene = 500 Kcal/H.m² °C. mm
k.2 = thermal conductivity of scale
  (Calcium Carbonate) = 1,250 Kcal/H.m² °C. mm

Exercise No. 1

(a) Steel tubes; 1.6 mm wall thickness (0.063 inch)
(b) Surface; clean, scale free $$U \cdot 1 = \frac{1}{\frac{1}{2000} + \frac{1.6}{50,000} + \frac{1}{1000}} = 652$$

Exercise No. 2

(a) Steel tubes; 1.6 mm wall thickness (0.063 inch)
(b) Surface with 1.0 mm scale thickness (0.04 inch)

$$U \cdot 2 = \frac{1}{\frac{1}{2000} + \frac{1.6}{50,000} + \frac{1.0}{1250} + \frac{1}{1000}} = 428$$

Exercise No. 3

(a) Polyethylene tubes; 1.6 mm wall thickness (0.063 inch)
(b) Surface; clean, scale free $$U \cdot 3 = \frac{1}{\frac{1}{2000} + \frac{1.6}{500} + \frac{1}{1000}} = 213$$

Exercise No. 4

(a) Polyethylene tubes; 1.6 mm wall thickness (0.063 inch)
(b) Surface with 1.0 mm scale thickness (0.04 inch)

$$U \cdot 4 = \frac{1}{\frac{1}{2000} + \frac{1.6}{500} + \frac{1.0}{1250} + \frac{1}{1000}} = 182$$

Exercise No. 5

(a) Polyethylene film tube: 0.2 mm wall thickness (0.00784")
(b) Surface: clean, scale free $$U \cdot 5 = \frac{1}{\frac{1}{2000} + \frac{0.2}{500} - \frac{1}{1000}} = 526 \text{ Kcal/H} \cdot m^2 \, ^\circ C.$$

THE INVENTION

Figure 3:
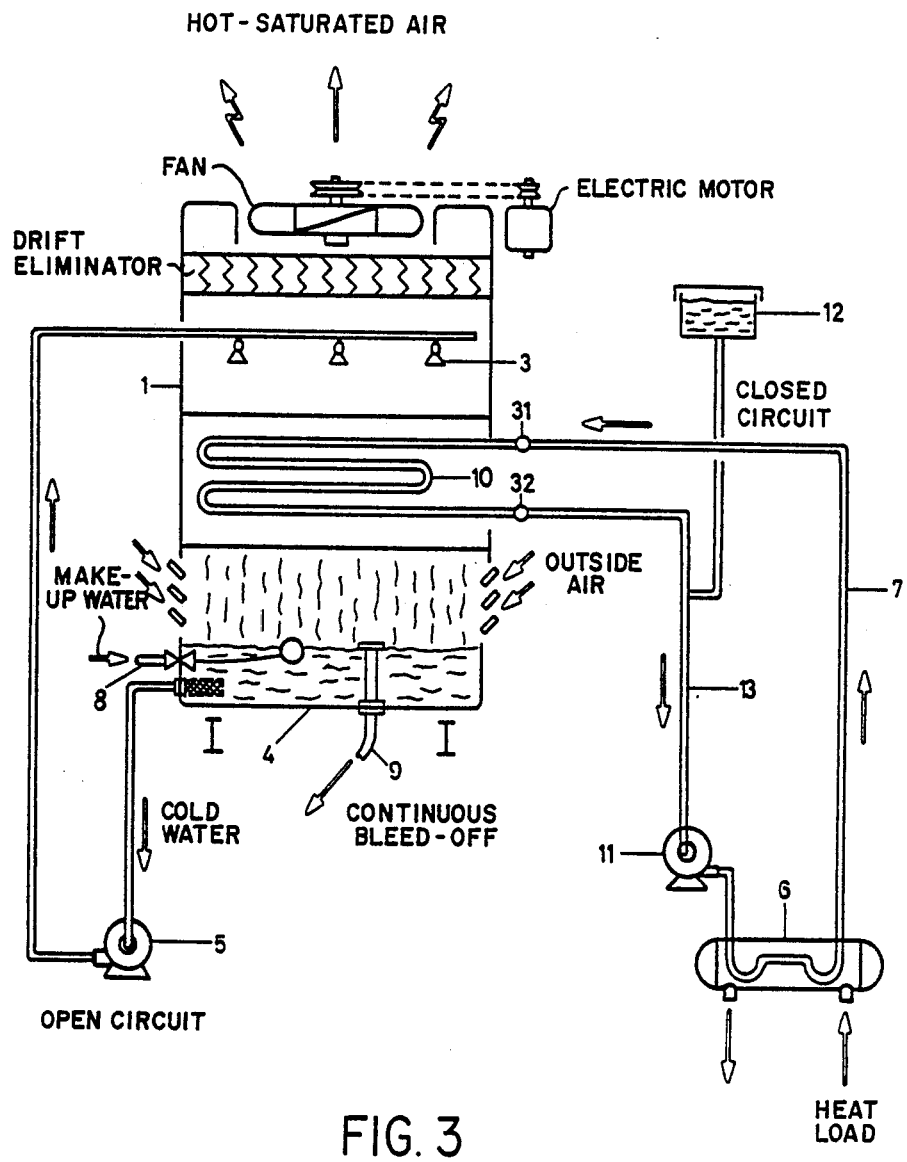
FIG. 3 is a typical closed circuit cooling tower or evaporative fluid cooler.

Looking at FIG. 3, one notices that the total head or pressure required at the inlet of the heat exchanger 10 is the energy needed to overcome friction losses to keep the water circulating through the coils. On the other hand, the static head in repose, will depend on the height of the expansion tank 12. The average distance between the inlet 31 and the outlet 32 headers is between 2½ to 4 feet.

The expansion tank 12 need not be any higher than 1½ to 2 feet above the inlet header of the heat exchanger 10. Therefore, the static head exercised at the level of the outlet header cannot be greater than 6 to 8 feet. This pressure is no problem for a plastic tube (polyethylene) with a wall thickness of 0.2 mm (0.007874 inch) as long as the hot fluid is not above 43° C. (110° F.). It is understood, of course, that other plastics will have different characteristics so temperature, pressure and diameter and shape of the tube will be taken into account in selecting the proper thickness of the plastic tube wall, an objective of the invention being to make the tube walls as thin as practically possible. For example, cross linked polyethylene materials have been devised, for packaging for example, which are strong, tough, tear, abrasion and scale resistant and extremely thin for superior heat transfer properties.

A polyethylene tube of this thickness is very flabby and elastic and the circular shape of the tube is only attained when the tube is submitted to a certain pressure; a very low pressure in this case.

Exercise No. 5 in the section entitled "The Overall Heat Exchanging Coefficient" indicates "U" value of 526 Kcal H.m$^{2\circ}$ C. for a plastic tube with a 0.2 mm wall thickness. This value of "U" is equivalent to a steel pipe with 0.5 mm (0.02 inch) of scale on its external surface. See Exercise No. 1 and No. 2. A scale deposit of 0.5 mm thickness is not unusual to find in many well maintained evaporative fluid coolers operating in the field. Currently, U.S. manufacturers of evaporative coolers with steel tubes use an average "U" of 500 Kcal/H.m$^{2\circ}$ C. (100 BTU/H. ft.$^{2\circ}$ F.), which gives them coverage for the inevitable scale build-up and consequent drop of performance in the unit.

The invention takes advantage of the flabby and elastic characteristic of the thin plastic wall during operation: The pulsations of pump 11, FIG. 3, will cause the plastic pipe to expand and contract; when closing down the unit and stopping the pump 11, the variation between the dynamic head and the static head exercised on the heat exchanger 10 will cause a collapse of the circular shape of the tube. Both the pulsating effect of the flowing fluid an and the deformations caused by the pressure variations when starting and stopping the pump shall keep the external surface of the plastic pipe completely free of scale deposits. The "U" coefficient will be constant throughout the life of the heat exchanger.

The present invention enables the use of thin walled plastic pipe. As was explained earlier, the thin plastic pipe is flabby and does not have the necessary strength or rigidity to support itself to conform a bank of tubes or coils. This has been overcome by the invention using several methods which are illustrated in FIGS. 4 through 17.

The inside diameter or free area 23 required is a function of the amount of fluid to be cooled as well as the maximum and minimum velocity to attain the desired overall heat transfer coefficient (value of "U").

Figure 4A:
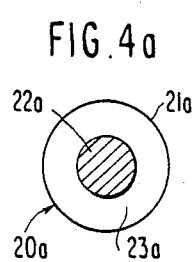
FIGS. 4a-4e illustrate embodiments of a thin plastic heat exchange tube incorporating the invention.

In practice, the cross-sections normally used correspond to pipes with an ID between ⅜" to 1.0 inch. Where horizontal pipe runs are required, an important feature of the invention is the combination of a flexible thin walled plastic pipe with a rigidifying element which can give the necessary rigidity and strength to the thin wall plastic pipe. This rigidifying and strengthening element can be an integral part of the pipe or it can be a totally independent element which takes the form of a core. FIGS. 4a through 4e show an assembly 20a which consists of a thin and elastic wall pipe 21a and a core 22a. In FIG. 4a, when the space 23a is full of water, the pipe takes a circular shape and the core 22a becomes concentric; thus, the space 23a is annular. When the flow is stopped or the water is drained, the assembly 20a takes the shape shown in 4b; any scale that might have deposited on the outside surface, due to the evaporation of water of the open circuit, shall crack off when the pipe loses its shape. Scale is a non-elastic and rigid material, for this reason it cannot remain adhered to the deformative and elastic surface of the plastic pipe. Tests establish that it is very improbable that a crust of scale could ever be formed, because by nature the plastic rejects adherences, which is added to the effect of the minute pulsations of the plastic film (due to the effect of the pump) enhances the avoidance of scale build-up.

Figure 4B:
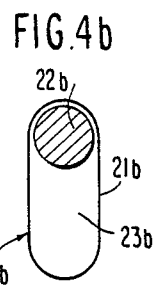
Figure 4C:
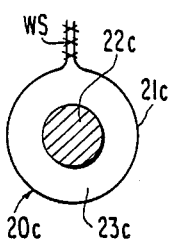
Figure 4D:
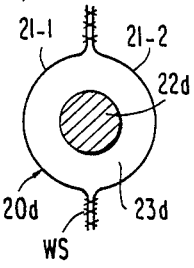
Figure 4E:
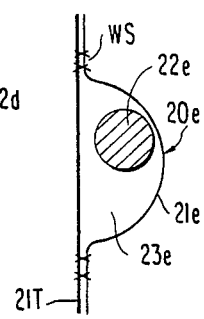

FIGS. 4c through 4e show various alternative ways of constructing the assembly. In FIG. 4c, a thin film 21c is rolled over core 22c and seam welded with heat (inductive, sonic, etc.). The seam SW is longitudinal and continuous. In FIG. 4d, two films 21-1 and 21-2 are welded over core 21d with two welded seams. FIG. 4e shows that the tubular fluid passage can also be obtained using one thick film 21T and a thin, more deformable and resilient film 21e. In these embodiments, the thin film can, if desired, be pre-formed (for example, vacuum formed) prior to their being welded together.

FIGS. 4a through 4e demonstrate that the tubular shape can be obtained by extrusion or by using plastic film according to the invention.

Figure 5:
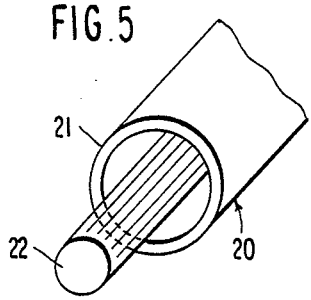
FIGS. 5-17 illustrate other embodiments of a thin plastic heat exchange structure incorporating the invention.
Figure 6:
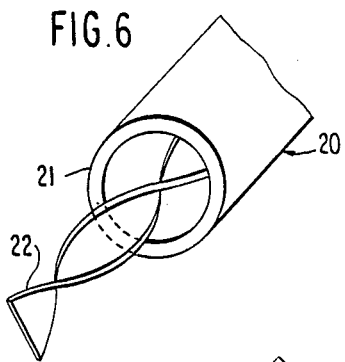
Figure 7:
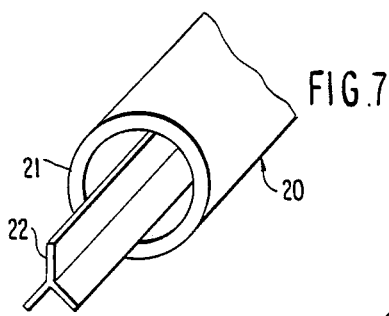
Figure 8:
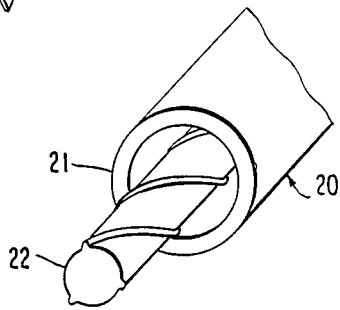
Figure 9:
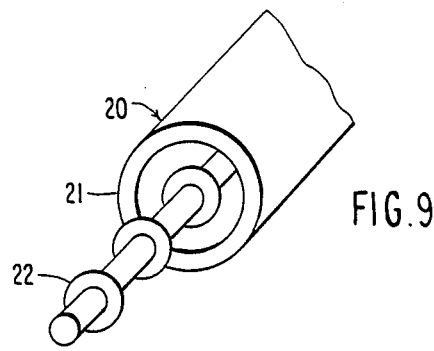
Figure 10:
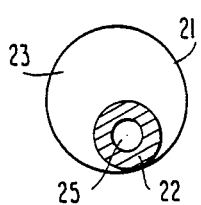
Figure 11:
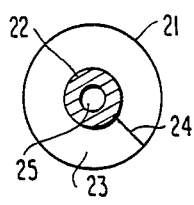

FIGS. 5-9 show various forms which the core 22 may take, such as fluted, as shown in FIG. 5, helical as shown in FIG. 6, ribbed triangularly as shown in FIG. 7, helical rib as shown in FIG. 8 and ringed turbulator rib as shown in FIG. 9, for turbulation purposes.

FIGS. 4 through 9 represent only a few of the many arrangements of pipe 21 with a separate core 22; these cores can be of plastic material but the inventor has also made prototypes using metallic cores. The spiral shaped cores enhance turbulence to obtain an improvement in the heat transfer.

FIGS. 10 through 14 represent only a few of the many arrangements of an integral plastic extrusion of pipe 21 and supporting element 22. In FIGS. 4 through 9, the core 22 has to be threaded through the inside of pipe 21. In FIGS. 10 through 14, the core is an integral part of the assembly, however, the thickness of the pipe 21 is independent of the thickness of the core 22. The core may be tangent to the pipe as in FIG. 10 or it can be connected to the pipe by one or more membranes or vanes 24.

Figure 14:
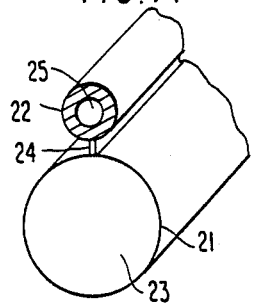
Figure 15B:
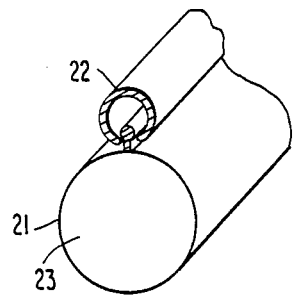
Figure 15A:
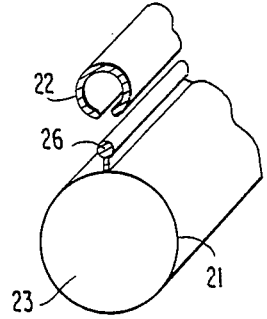
Figure 15B:
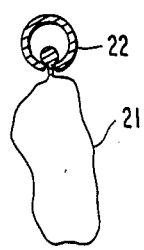
Figure 15C:
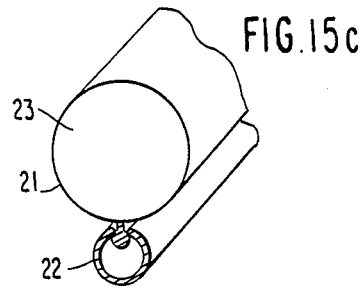
Figure 15C:
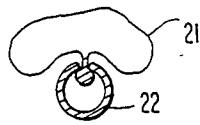

FIG. 14 shows the core 22 on the outside of the pipe 21, but again, as an integral extrusion.

Figure 16:
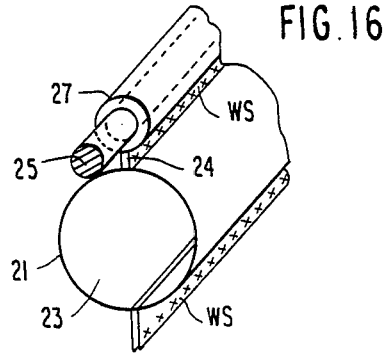
Figure 17:
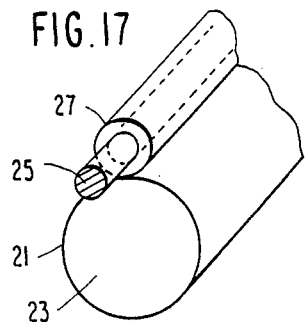

FIG. 15 also shows an external core, but in this case, core 22 is a separate component which has a longitudinal slot that slides into a protruding strip 26 of the pipe 21. Another possible combination is illustrated in FIGS. 16 and 17. The plastic extrusion or seam welded portion comprises the thin wall pipe 21 and a longitudinal jacket 27; the core 25 is a separate element which is threaded into jacket 27.

In all cases, the fluid of the closed circuit only flows through space 23; any hollow cores 25 are blocked in one or both ends to avoid any circulation of fluid therein.

Figure 12:
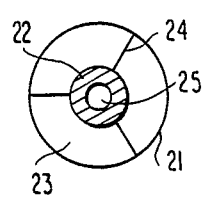
Figure 13:
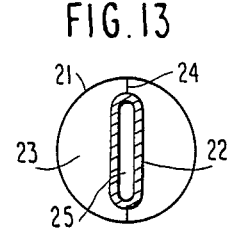

As shown in FIG. 18, the connection of the flabby heat exchange pipe of FIG. 12 to distribution header 50 is achieved by providing a spigot 51 projecting from wall 52 of distribution header 50 centrally through nipple 53 which extends through wall 54 of distribution header 50. Distribution header walls 52 and 54 are joined by an adhesive or welding along joint flanges 55, 56, respectively. Rigid pipe or spine member 22 is joined to spigot 51 by telescoping thereover so as to seal the hollow space or core 25 of member 22 and prevent flow through core 25. As shown, spigot 51 is tapered to enter the correspondingly tapered end of rigidifying member 22. The cross-sectional area of space between the outer surface of spine member 25 and the inner surfaces of the flabby plastic heat transfer member 21 defines the flow path for the latent heat bearing fluid. A conventional hose clamp 58 encircles the end 21e of the flabby plastic tube 21 and the ends are drawn together to tighten and to seal same by a threaded fastener 58T. It will be appreciated that many other forms of seals can be fashioned to assure low cost seals and joints of the thin, flabby plastic heat exchange tubes and rigidifying members to the headers.

In the embodiment shown in FIG. 19A, the flow passages are constituted by a pair of concentric, thin-walled, tubular plastic members CC1, CC2 which are sealed at their upper and lower ends, UCC and LCC about upper annular sub-header USH which is coupled to an upper main header UMH by connector pipe HC passing through a opening collar ULC in the upper end of outer thin-walled plastic member CC, which is sealed by clamp SC. Fluid from the upper sub-header USH exits via a plurality of orifices or slits USHO to the annular space between the thin-walled tubular members CC1 and CC2.

Lower annular sub-header LSH is coupled to a lower main header LMH by a connector pipe LC which passes through a lower sealing collar LSC in the lower end of outer thin-walled plastic tubular member CC1. A heat exchange fluid which can be air, water, air and water or other fluid is flowed over both external surfaces of the inner and outer tubular members. In this embodiment, the inner and outer thin-walled tubular plastic members CC1 and CC2 are hung from upper sub-header USH, and made from a cross-linked polyethylene film or similar material having a thickness of about 200 microns or 4 mil (0.004"). The annular passage between inner and outer tubular members CC1 and CC2 is maintained small so that the inner core of fluid flowing through the annular passage is properly treated in the heat exchange medium. To this end, the spacing is maintained by a helical cone elime HCE, as shown in FIG. 19b, which is spot welded or joined to the inner and outer tubular members CC1 and CC2 to permit flow therearound as indicated by the arrows, and which in addition to providing a turbulating effect on the fluid also assures flow of medium is thin between the thin plastic walls to assure a good heat transfer relation through the thin plastic members.

Figure 20B:
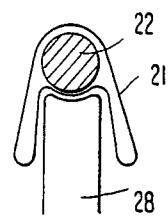
FIG. 20b illustrates a section of the pipe of FIG. 4b and 20b wherein internal fluid is operating at low flow or stopped.
Figure 20C:
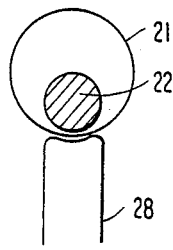
FIG. 20c illustrates the same section with normal flow which allows for deformation when the assembly is supported.

FIG. 20 illustrates a typical heat exchanging coil supported at intervals by saddles 28. The elasticity of pipe 21 allows for the deformation shown in FIG. 20c, wherever the assembly 20 is supported.

FIG. 20b is a repetition of FIG. 4b, when the system is operating at low flow or stopped.

Figure 21:
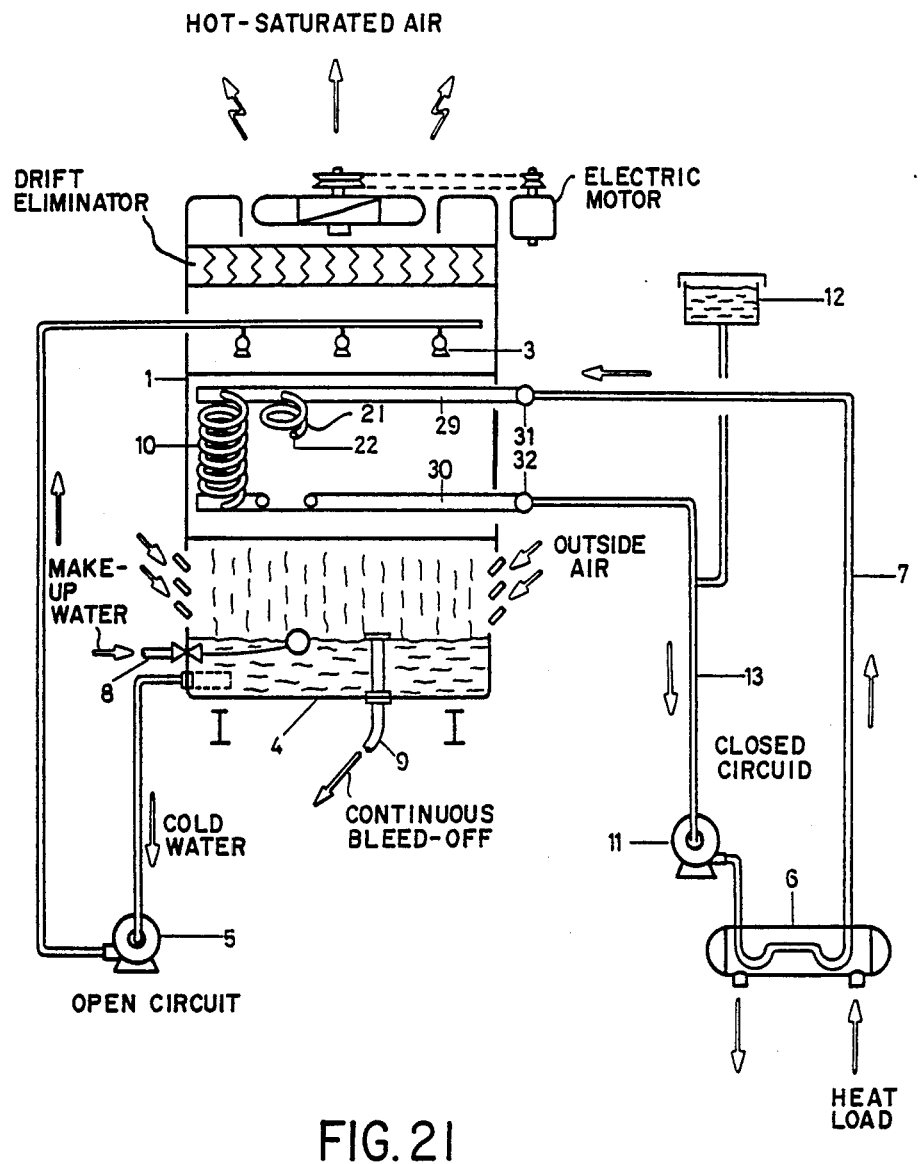
FIG. 21 illustrates a counter flow system incorporating the invention.

The inventor prefers the counter-flow arrangement shown in FIG. 21. The numbers used coincide with those identifying FIG. 3. The heat exchanger 10 is made up of a series of sections; each section comprises of several spring shaped coils connected at the top to a hot water header 29 and at the bottom to a cold water header 30. In turn, the headers 29 are fed through a main hot water distribution manifold 31; likewise all cold water headers 30 are connected to the main collector 32.

Figure 22:
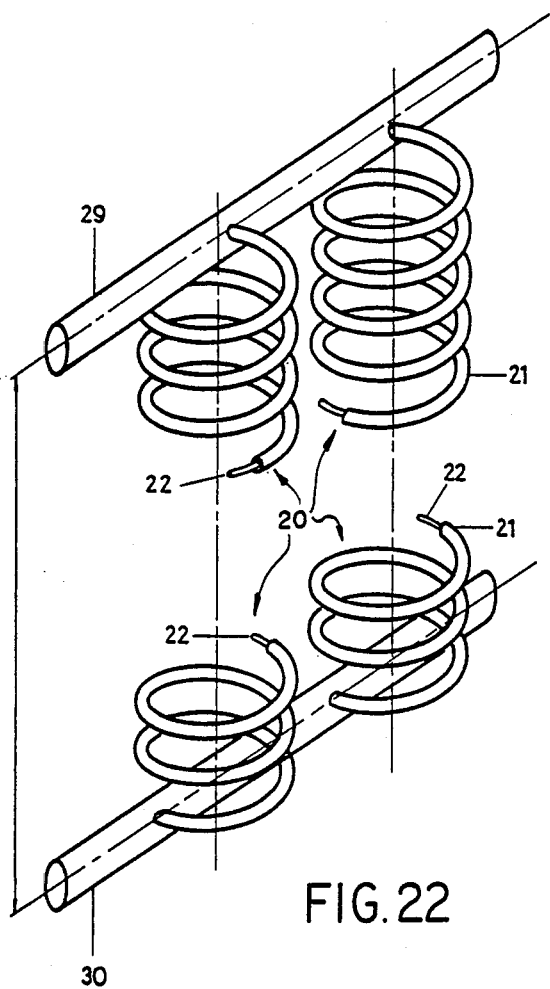
FIG. 22 illustrates a helical coil heat exchange system incorporating the invention.

The coils are again shown in FIG. 22; this arrangement has various advantages:

(1) The thermal expansion problem of the plastic materials is completely eliminated, because the free standing and particular configurations of the (spring) coils absorb the thermal elongations or contractions.

(2) Because the fluid follows the circular pattern of the spring shape coils, the turbulence is greater than when it flows in linear pipes; thus, this has a very significant effect on the overall heat transfer coefficient, enabling to reduce the heat transfer surface.

(3) The height between the hot water and cold water headers is about 4 feet; however, the actual length of the coil can be about 50 feet. This reduces the amount of connections between headers 29/30 and coil assembly 20.

(4) As the open circuit water flows down by gravity, it tends to form a film over the coils and spins down washing off any adherences the pipe may have.

Figure 23A:
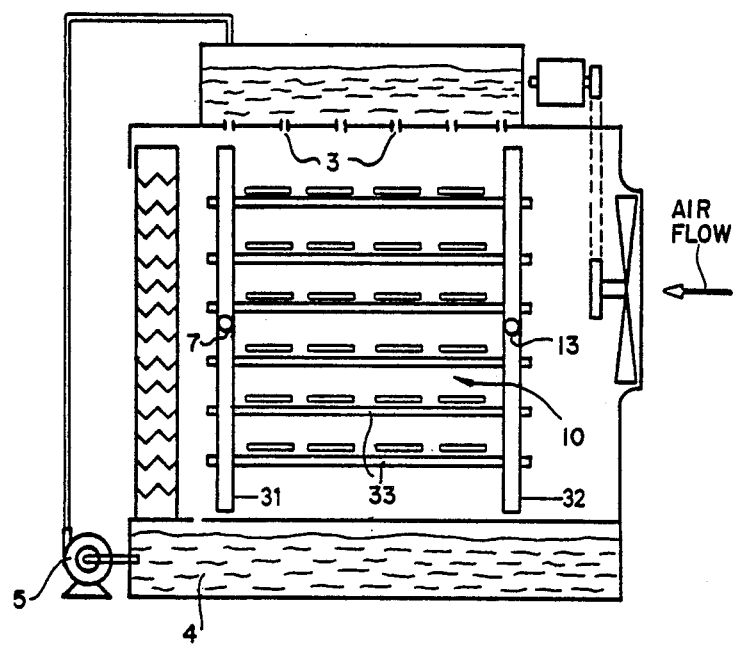
FIG. 23a illustrates a cross flow tower with FIG. 23b isometrically illustrating the coil arrangement.
Figure 23B:
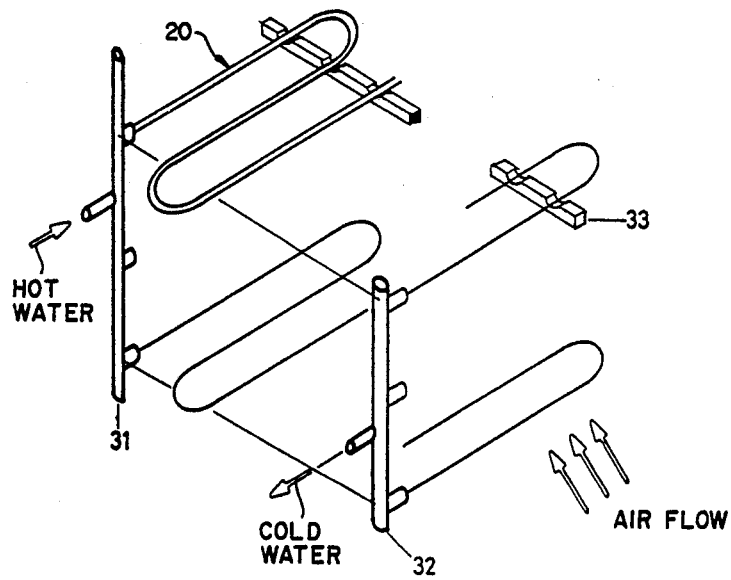

The invention also ran tests in a "cross flow tower" of the type shown in FIG. 23. In that instance, the coils used were of the design described in FIG. 15c; the hard cores 22 layed on plastic racks 33 giving the coil freedom of movement for thermal expansion.

FIG. 23d shows the thin wall pipe in a collapsed position, once the water has been drained.

Figure 24A:
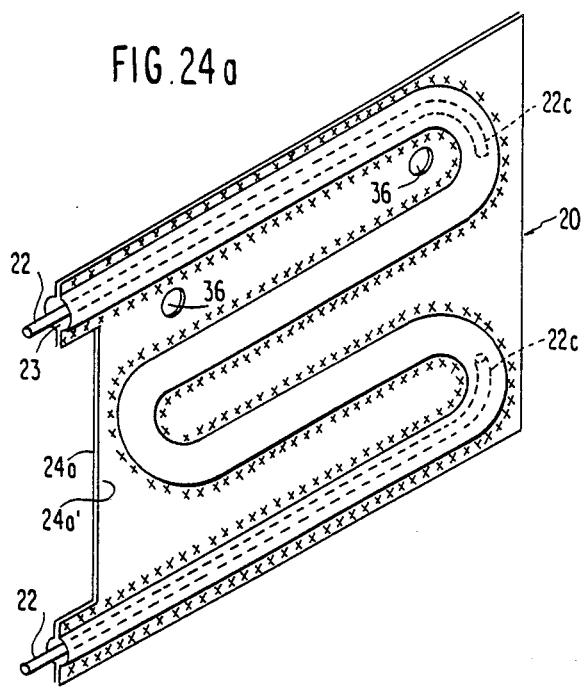
FIGS. 24a-24c illustrate thin plastic film heat exchange panels incorporating the invention.
Figure 24B:
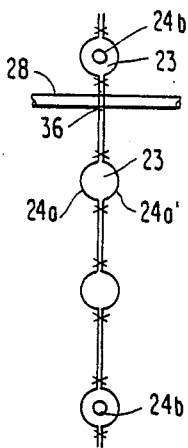
Figure 24C:
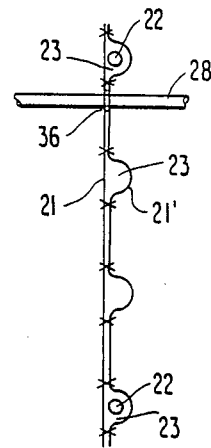

FIGS. 24a through 24c illustrate thin plastic film heat exchange panels incorporating the invention. Vacuum formed films, high density thin films polyethylene (0.006" films) were vacuum formed to make panels as shown in FIG. 224a, with two sheets welded together as shown in FIG. 24b (the xx indicating weld line). Each panel measures 3'×1' and the tubular paths are at 3¼" between centers.

The structure core 22 is layed inside the lower film (pre-vacuum formed). The other film is layed on top, matching the grooves, and seam welded. This method eliminates the need of threading in the core at a later date. FIG. 24a shows the core ending 22c just beyond the return bend. Holes 36 are for mounting on support beams or rails as shown in FIG. 26. The core used was a OD ⅜" PVC, heavy wall. In FIG. 26, I illustrate how each panel is supported by beams 28. Actually, while an "I" beam shape is shown in practice, PVC pipes OD 1½", heavy wall, can be used for this purpose.

FIG. 24b shows a panel built with two films of equal thickness and therefore, when water is circulating inside the tubular shape, the tube wall tends to be round.

FIG. 24c shows one film straight and the other taking the tubular shape. A detail has also been shown in FIG. 4e. In a panel of the type shown in FIG. 24a, excellent results were achieved using 0.012" on one film and reducing to les than 0.006" the thickness of the other. The 0.012" film has an extraordinary strength and remain undeformed in height when the tubes are filled with water. The construction is very simple and inexpensive. These panels enhance the evaporative or second phase of the heat transfer process. The purpose of the present invention is to cool a given fluid through a "closed circuit system". The thermal transfer occurs under two phases:

(a) The first phase takes care of conveying the heat from the hot fluid through the plastic tube wall and delivering to the cold water of the open circuit.

(b) The second phase transmits the heat picked up by the open circuit water, to the passing air. This is the evaporative cycle. The evaporative cycle has been described in FIG. 1, explaining that a laminar fill or splash deck was used for that purpose. The assembly shown in FIG. 25 using panels FIG. 24a is undoubtedly a very efficient combination since the closed circuit piping or coils are obtained, but simultaneously we have been able to produce true extended evaporative surface.

Figure 25:
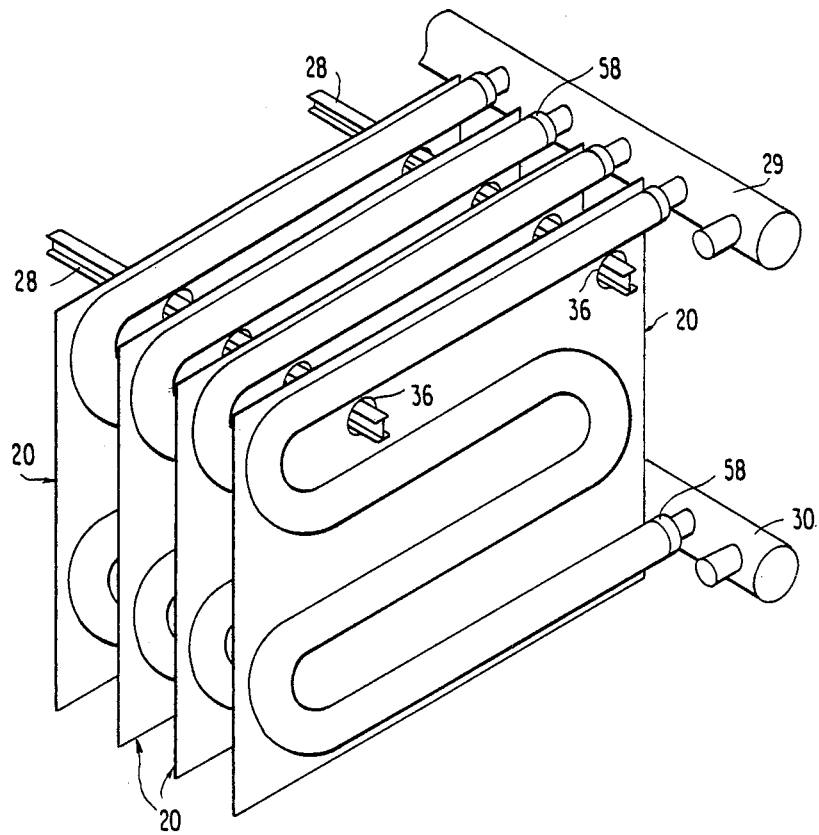
FIG. 25 illustrates an array of thin plastic film exchange panels in true extended evaporative surface.

FIG. 25 shows how the hot water (closed circuit) is fed into each panel via header 29; the clamps 58 have been described in relation to FIG. 18. These panels are most practical and lowest cost way to make use of the invention.

Summarying benefits of the invention are:

(1) For equal thermal performance the plastic heat exchanger can weigh from 30 to 35 times less than a steel unit.

(2) The plastic material used rejects scale, but also, because of its elasticity, it has the virtue of self-cleaning and eliminating any scale which may have adhered to its surface.

(3) Chemical products and additives used to control the growth of algae do not affect the plastic coils.

(4) With plastic heat exchangers there are no galvanic current problems, which are a frequent cause of trouble and corrosion in metallic heat exchangers.

(5) The light weight of the heat exchanger also allows to use much lighter supporting structures.

(6) Because of its light weight and flexibility, it simplifies repair work and maintenance.

(7) Transportation and handling charges are much lower, as well as erection costs in the field.

(8) The initial cost of an all plastic evaporative cooler can be much less than half the cost of a metallic unit. In addition, the expected useful life of the plastic tubes is also much greater. Because of its self-cleaning and self descaling, the maintenance cost of a plastic unit is practically nil versus the high maintenance cost of most metallic units.

While the invention has been described in connection with a preferred embodiment thereof, it will be appreciated that various changes and modifications can be made without departing from the spirit and scope of the invention as defined in the appended claims.

What is claimed is:

1. A heat exchange apparatus for cooling and condensing by evaporation, comprising a plurality of plastic heat exchange elements having a fluid passage therein and external surfaces adapted to be mounted in a heat exchange zone wherein a cooling medium, including water in droplet form contacts said external surface, said plastic heat exchange elements being constituted by a pair of thin-walled plastic sheets, and means sealing said plastic sheets together so as to define the boundaries of an annular passage through said heat exchange zone, and means for joining one end of said passage to said first header means and means for joining the other end of said passage to said second header means at least one said plastic sheets being a thin-walled plastic film such that the cross-sectional shape of said annular passage is attained when fluid in said annular passage is subjected to a predetermined internal pressure, each said plastic heat exchange element and the annular passage therein is vertically oriented.

2. In a heat exchange system having a first header for receiving fluid under pressure from a source, heat exchange elements receiving said fluid from said first header and defining a plurality of passages for said fluid through a heat exchange zone, and a second header receiving said fluid after passage through said heat exchange elements, the improvement in the method of preventing scale build-up on surfaces of said heat exchange elements comprising forming said heat exchange elements by a pair of concentric thin-walled plastic tubular members of different diameters to define an annular flow path in each heat exchange element in said heat exchange zone, and causing said heat exchange elements to expand and contract by the pressure of fluid flowing through said plurality of passages.

* * * * *